(12) United States Patent
Jerebko et al.

(10) Patent No.: US 7,333,644 B2
(45) Date of Patent: Feb. 19, 2008

(54) SYSTEMS AND METHODS FOR PROVIDING AUTOMATIC 3D LESION SEGMENTATION AND MEASUREMENTS

(75) Inventors: Anna Jerebko, West Chester, PA (US); Arun Krishnan, Exton, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 731 days.

(21) Appl. No.: 10/796,863

(22) Filed: Mar. 9, 2004

(65) Prior Publication Data

US 2004/0228529 A1   Nov. 18, 2004

Related U.S. Application Data

(60) Provisional application No. 60/453,573, filed on Mar. 11, 2003.

(51) Int. Cl.
    *G06K 9/00*   (2006.01)
(52) U.S. Cl. .................. 382/128; 382/154; 382/173
(58) Field of Classification Search ............... 382/128, 382/129, 130, 131, 132, 133, 137, 167, 171, 382/173, 177, 179, 134, 154, 164, 190, 198, 382/248, 276, 277, 288, 125; 600/407, 410, 600/425, 306, 404; 378/4, 21, 23, 27
    See application file for complete search history.

(56) References Cited

U.S. PATENT DOCUMENTS 5,825,908 A * 10/1998 Pieper et al. ............... 382/131
5,836,872 A * 11/1998 Kenet et al. ................ 600/306
6,146,390 A * 11/2000 Heilbrun et al. ............ 606/130
6,529,758 B2 * 3/2003 Shahidi ...................... 600/407
7,043,064 B2 * 5/2006 Paik et al. ................... 382/128
2003/0223627 A1 * 12/2003 Yoshida et al. ............. 382/128

FOREIGN PATENT DOCUMENTS

WO    WO 02/29717 A2    4/2002

OTHER PUBLICATIONS

You, Suya et al., "Interactive Volume Rendering for Virtual Colonoscopy," *Proceedings Visualization*, IEEE Conference on Visualization, (1997) pp. 433-436 XP010270139.
Thompson, P. M. et al.; "Detection, Visualization and animation of abnormal anatomic structure with a deformable probabilistic brain atlas based on random vector field transformations," *Medical Image Analysis* (1997) vol. 1, Nr. 4, pp. 271-294 XP002315795.

* cited by examiner

*Primary Examiner*—Samir Ahmed
*Assistant Examiner*—Abolfazl Tabatabai

(57) ABSTRACT

Systems and methods are provided for automatic 3D segmentation of abnormal anatomical structures such as colonic polyps, aneurisms or lung nodules, etc., in 3D medical imaging applications. For example, systems and methods for 3D lesion segmentation implement a centroid-based coordinate transformation (e.g., spherical transformation, ellipsoidal transformation, etc.) to transform a 3D surface of the lesion from an original volume space into, e.g., a spherical or ellipsoidal coordinate space, followed by interpolation of the transformed lesion surface to enable accurate determination of a boundary between a lesion and surrounding normal structures.

40 Claims, 13 Drawing Sheets

Normalizing factor $\delta(r) = r_{max} / r$

Discreetization degree $D = round(2\pi r_{max})$

SYSTEMS AND METHODS FOR PROVIDING AUTOMATIC 3D LESION SEGMENTATION AND MEASUREMENTS

CROSS-REFERENCE TO RELATED APPLICATION

This application claims priority to U.S. Provisional application Ser. No. 60/453,573, filed on Mar. 11, 2003, which is fully incorporated herein by reference.

TECHNICAL FIELD OF THE INVENTION

The present invention relates generally to a systems and methods for three-dimensional (3D) medical image rendering and visualization. More specifically, the present invention relates to medical imaging systems and methods for providing automatic 3D segmentation of abnormal anatomical structures (lesions) such as colonic polyps, aneurisms or lung nodules, as well as methods for obtaining accurate size measurements and other descriptive characteristics of segmented lesions, which are useful for identification and classification.

BACKGROUND

In the field of medical imaging, the segmentation of abnormal anatomical structures (lesions) such as colonic polyps, aneurisms or lung nodules is a challenging problem because of the highly variable shape, texture, density and size of such lesions and their attachment to surrounding normal structures. For example, the problem of colonic polyp segmentation is particularly difficult considering the complex shape of colon wall where prominent or thickened Haustral folds and retained stool often resemble the shape and density of polyps.

Various methods have been proposed to provide automated segmentation of lesions in medical imaging systems. For example, previously published methods of automatic colonic polyp segmentation have been proposed which employ surface segmentation using three-dimensional shape features, 2D polyp segmentation techniques, or deformable models. More specifically, by way of example, a polyp segmentation method that employs surface segmentation using three-dimensional shape features is disclosed in the article by H. Yoshida, et al, entitled *"Computerized Detection of Colonic Polyps at CT Colonography on the Basis of Volumetric Features: Pilot Study"*, Radiology 2002, 222: 327-336. This reference discloses a polyp candidate detection scheme, which employs polyp segmentation by extracting spatially connected voxels on the colon surface having particular shape characteristics. Conditional morphological dilation is used as a subsequent step.

Further, a 2D polyp segmentation method is disclosed, for example, in the reference by S. Göktürk, et al., entitled *"A statistical 3-D pattern processing method for computer-aided detection of polyps in CT colonography,"* IEEE Trans. Med. Image., vol. 20(12), pp. 1251-60, December 2001. This reference describes a 2D polyp segmentation technique that is applied to several triples of perpendicular planes slicing the sub-volume around the polyp candidate. The segmentation aims to find the best square window that contains a candidate polyp. A quadratic curves and line fitting algorithm is used to find the polypoid structure within the sub-window.

The drawback 2D polyp segmentation applied to the sub-images extracted from the axial slices or to triples of perpendicular planes slicing the sub-volume around the polyp candidate is that the three-dimensional connectivity information is not taken in to account.

Another colonic polyp segmentation process that uses 3D shape features is disclosed in the reference by H. Yoshida, et al., entitled *"Computerized Detection of Colonic Polyps at CT Colonography on the Basis of Volumetric Features: Pilot Study,"* Radiology 2002 222: 327-336. This reference describes a 3D polyp surface extraction method, which enables segmentation of only polyp surface vertices. However, the above-referenced segmentation methods which employ 2D polyp segmentation or 3D polyp surface segmentation are not suitable for extraction of a continuous lesion, nor obtaining precise 3D measurements and descriptive features characterizing density, texture and shape of an entire lesion volume.

Another polyp segmentation is proposed by J. Yao, et al., *"Automatic segmentation and detection of colonic polyps in CT colonography based on knowledge-guided deformable models"*, Medical Imaging 2003, SPIE, Vol. 5031-41, in press. Yao et al proposes an automatic polyp segmentation method based on the combination of fuzzy c-mean clustering and deformable models. The gradient of the fuzzy membership functions is used as the image force to drive a deformable surface around the seed to the polyp boundary. This method takes in account intensity variations in the first place and, therefore, may have misleading segmentation results in cases when loops of the colon touch without visible boundary or intensity change between them. In such cases, the volume of interest may contain two colon lumens separated by tissue or two adjacent colon walls one of which contains the polyp, and wherein the surface below the polyp belongs to another bowel loop. The proposed method can mistake the surface below the polyp to be a portion of the polyp surface, which could lead to extracting volume greater than actual polyp size.

SUMMARY OF THE INVENTION

Exemplary embodiments of the invention generally include 3D medical imaging systems and methods that provide automatic 3D segmentation of abnormal anatomical structures (lesions) such as colonic polyps, aneurisms, lung nodules, etc, and obtaining accurate size measurements and other descriptive characteristics of 3D segmented lesions that can be used for identification and classification. More specifically, exemplary embodiments of the invention generally include systems and methods for providing accurate 3D lesion segmentation using a centroid-based coordinate transformation (e.g., spherical transformation, ellipsoidal transformation, etc.) to transform a 3D surface of the lesion from an original volume space into, e.g., a spherical or ellipsoidal coordinate space, followed by interpolation of the transformed lesion surface to enable accurate determination of a boundary between a lesion and surrounding normal structures.

In one exemplary embodiment of the invention, a method for automatic 3D (three-dimensional) lesion segmentation includes: determining a 3D surface of a lesion within an image dataset in a first coordinate space; performing a centroid transformation of the 3D surface using a centroid of the lesion in the first coordinate space, to generate a transformed surface representation of the 3D surface in a second coordinate space; processing the transformed surface representation to determine a lesion surface which separates the lesion from surrounding normal structure; and transforming the lesion surface in the second coordinate space back to the first coordinate space to segment the lesion from the image dataset.

In another exemplary embodiment of the invention, a method for automatic 3D (three-dimensional) lesion segmentation includes: determining a 3D surface of a lesion in an original 3D volume space; transforming the 3D surface of the lesion to a spherical coordinate space; processing the 3D surface in the spherical coordinate space to determine a lesion surface in the spherical coordinate space which separates the lesion from surrounding normal structure; transforming the lesion surface in the spherical coordinate space to the original 3D volume space; and extracting a volume corresponding to the lesion from the original 3D volume space using the transformed lesion surface.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

In general, exemplary embodiments of the invention as described herein include systems and methods for automatic 3D segmentation of abnormal anatomical structures such as colonic polyps, aneurisms or lung nodules, etc., in 3D medical imaging applications. In one exemplary embodiment of the invention described herein, a system and method for 3D lesion segmentation implements automated methods for spherical coordinate transformation of a 3D edge image and subsequent interpolation of a lesion surface, which enables an accurate determination of a boundary between a lesion of interest and surrounding normal anatomical tissue and structures.

Further, exemplary systems and methods according to the invention provide methods for automatically measuring various dimensions and characteristics of 3D segmented lesions, which can be implemented for purposes of identification or automatic classification based on the extracted lesion volume. In particular, systems and methods according to the invention can assist a user (radiologist) to automatically obtain accurate lesion size measurements, to discriminate between lesion and other anatomical structures such as healthy tissue, left over stool or streak artifacts. Moreover, computer aided detection (CAD) systems could be extended to include 3D segmentation systems and methods according to the invention to thereby obtain additional discriminative features for characterization of abnormal lesions or as inputs for classification procedures.

It is to be understood that the systems and methods described herein in accordance with the present invention may be implemented in various forms of hardware, software, firmware, special purpose processors, or a combination thereof. In one exemplary embodiment of the invention, the systems and methods described herein are implemented in software as an application comprising program instructions that are tangibly embodied on one or more program storage devices (e.g., magnetic floppy disk, RAM, CD Rom, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
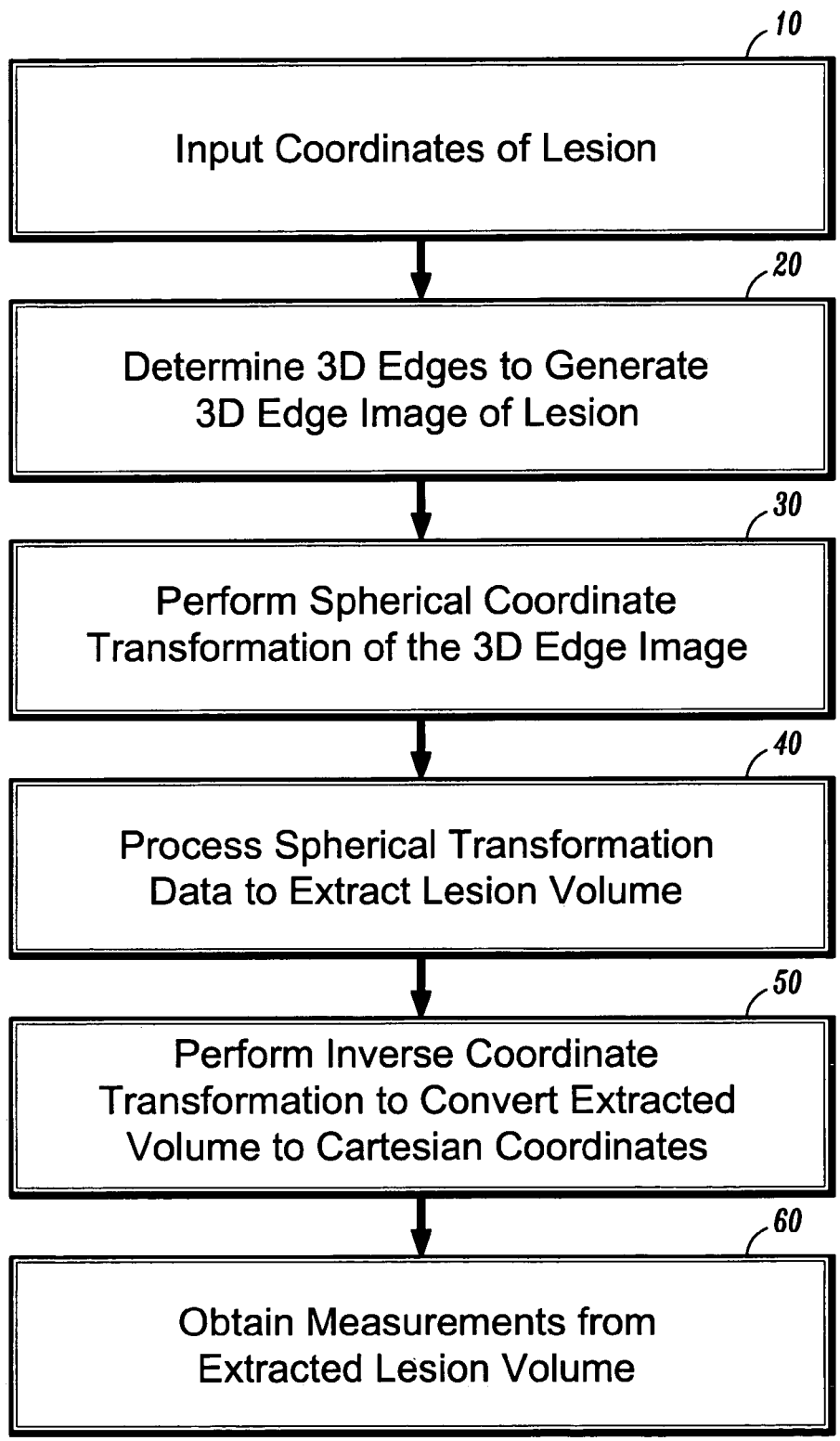
FIG. 1 is a flow diagram illustrating a method for automatic 3D lesion segmentation according to an exemplary embodiment of the invention.

FIG. 1 is a flow diagram illustrating a method for providing automatic 3D lesion segmentation according to an exemplary embodiment of the invention. FIG. 1 can be further viewed as a system for providing 3D segmentation, wherein the method steps depicted in FIG. 1 are components or modules that perform the methods and functions described herein for providing 3D lesion segmenting and measuring. Further, it is to be appreciated that the exemplary systems and methods described herein can be implemented for a 3D medical imaging and CAD systems or application for various imaging modalities (CT, MRI, etc.). Moreover, the exemplary systems and methods described herein are well adapted for automatic extraction and measuring of abnormal anatomical structures or lesions such as colonic polyps, aneurisms, lung nodules, etc. In this regard, although exemplary embodiments may be described herein with particular reference colonic polyp segmentation, nothing should be construed as limiting the scope of the invention.

Referring now to FIG. 1, an exemplary 3D lesion segmentation method commences, in general, with inputting coordinates of a lesion of interest to a segmentation module (step 10). In the following description, it is assumed that an original 3D volume dataset (e.g., multiple 2D slices) has been acquired a particular anatomy (e.g., colon, lungs, heart, etc.) in a particular imaging modality (e.g., CT, MRI, etc.). In one exemplary embodiment of the invention, the lesion coordinates may be input via a GUI (graphical user interface) wherein an individual can use a mouse or pointing device, for example, to select a region of interest (e.g., polyp) of a 2D or 3D displayed image (e.g., 3D view within a colon). In another embodiment of the invention, the lesion coordinates may be input from an automated system or method, which is capable of automatically selecting/identifying candidate lesions locations (which may or may not require user verification before input).

Next, based on the input coordinates, a portion (sub-volume) of the original 3D volume dataset is processed (via an edge detection method) to determine a 3D edge (surface) of the selected lesion (step 20). More specifically, an edge detection process is implemented to determine the pixels in the 3D sub-volume image data, which are part of the 3D surface of the selected lesion in the original coordinate space. One exemplary method for performing 3D edge detection will be explained below with reference to, e.g., the flow diagram of FIG. 2 and the schematic diagrams of FIGS. 7A~7E.

In one exemplary embodiment of the invention, a spherical coordinate transformation is then applied to the 3D edge image data (step 30). In general, a spherical coordinate transformation process according to the invention transforms the 3D lesion surface into a surface representation of the selected lesion in spherical coordinate space based on a user-selected (or automatically computed) centroid location of the lesion of interest. It is to be understood that for purposes of illustration, an exemplary spherical transformation process will be described herein. But it is to be appreciated that in general, any suitable centroid transformation process may be implemented in accordance with the present invention, which takes spatial data from an original coordinate space (e.g., Cartesian coordinate space) and transforms the spatial data to correspond with spatial data from another coordinate space based on a user-selected or computed centroid location in the original coordinate space. The type of centroid transformation process used may depend on the typical shape of the lesions of interest. For instance, with respect to polyps, a centroid-based transformation may be implemented using an ellipsoidal transformation process since polyps are typically found to have shapes that are ellipsoidal in nature. In this regard, nothing herein should be construed as limiting the type of centroid-based transformation that can be used since one of ordinary skill in the art could readily envision and appreciate other centroid-based transformations that may be implemented for 3D segmentation based on the teachings herein.

The surface representation is further processed to accurately determine the surface the selected lesion including the boundary/transition region (e.g., polyp neck) between the lesion (e.g., polyp) to separate the selected lesion from surrounding tissue (colon wall) (step 40). Various exemplary embodiments of the invention for transforming the 3D edge data (lesion surface) into spherical coordinate space and processing the transformed data to extract the selected lesion, will be described in further detail below with reference to, e.g., the flow diagrams of FIGS. 3, 4 and 5.

After the selected lesion has been extracted in spherical coordinate space (step 40), an inverse transformation process is applied to convert the extracted volume data in the spherical coordinates to the original coordinates (e.g., Cartesian coordinates) to enable segmentation of the selected lesion from the original 3D sub-volume image data (step 50). An exemplary inverse transformation process according to an exemplary embodiment of the invention will be described below with reference to the flow diagram of FIG. 5, for example.

In another embodiment of the invention, an automated process may be implemented for obtaining various measurements with respect to the segmented lesion volume (step 60), which can serve as descriptive features for lesion identification and classification. For example, the measurements that can be obtained from the extracted lesion volume include, but are not limited to, lesion surface area, compactness, volume, mean and Gaussian curvatures, their averages, min, max and STD, sphericity average, min, max and STD, min and max diameter, height, neck area (for polyps), intensity mean, max, min and STD (to account for texture & artifacts).

Figure 2:
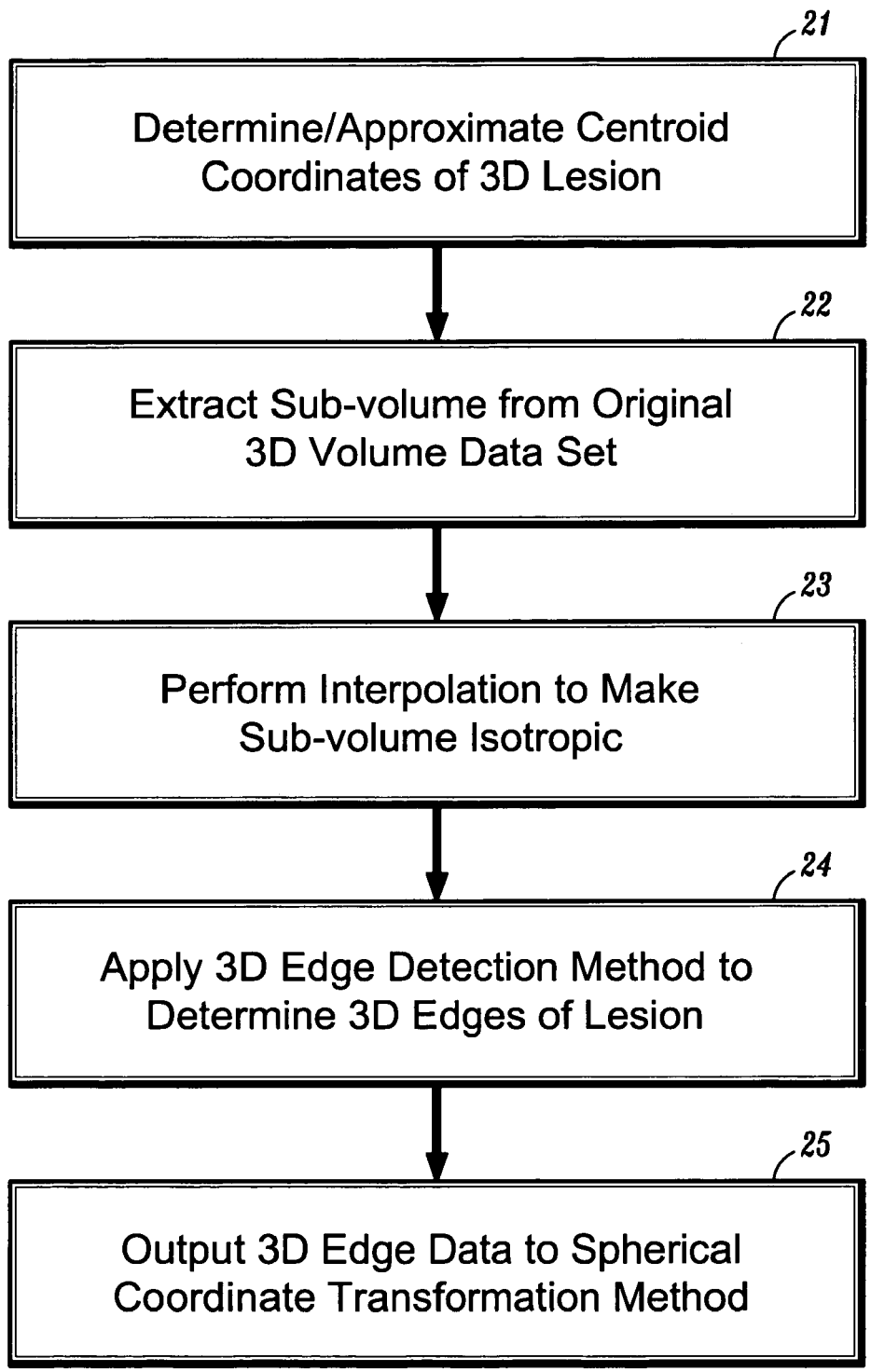
FIG. 2 is a flow diagram illustrating a method for determining a 3D edge image according to an exemplary embodiment of the invention, which can be implemented in the method of FIG. 1.

FIG. 2 is a flow diagram illustrating a method for determining a 3D edge image according to an exemplary embodiment of the invention. The method of FIG. 2 can be implemented for step 20 of the exemplary method of FIG. 1. For purposes of illustration, the exemplary method of FIG. 2 will be discussed with further reference to FIGS. 7A-7E, which schematically illustrate an exemplary method for detecting a 3D edge (surface) of a colonic polyp of interest according to the invention.

Figure 7A:
FIGS. 7A–7E are diagrams that schematically illustrate an edge detection method according to an exemplary embodiment of the invention.

Referring initially to FIG. 2, an initial step is to determine (or approximate) the centroid coordinates of the selected lesion (step 21). In one embodiment of the invention, the centroid coordinates of the selected lesion may be determined automatically using any suitable method. In another exemplary embodiment of the invention, the centroid coordinates may be user-selected, whereby a user selects a point on the displayed 2D canonical orthogonal views (axial, coronal or saggital) or 3D lesion (e.g., polyp) that is believed to be an approximate centroid location. For example, FIG. 7A is an exemplary 3D endoluminal view of a pedunculated polyp, wherein point C depicts a user-selected (or automatically determined) centroid location with respect to the 3D displayed polyp head.

Figure 7B:
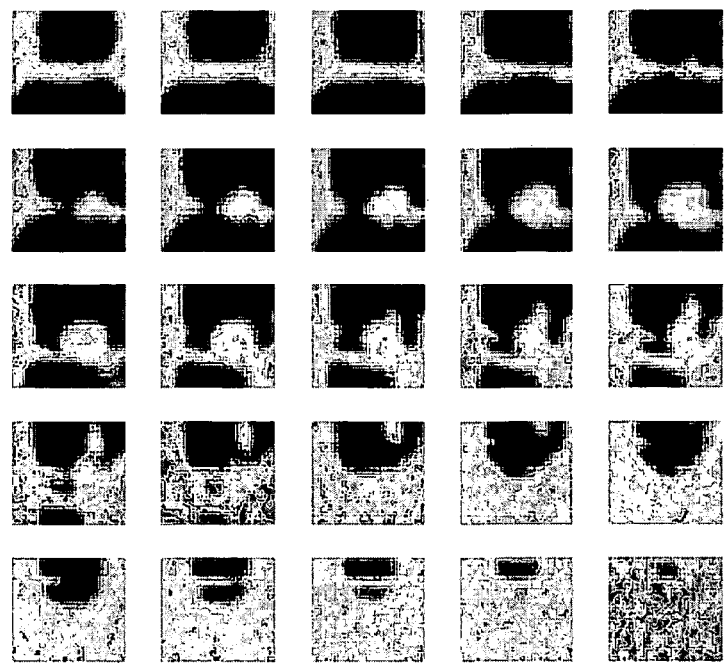

Then, a sub-volume dataset, which includes the selected lesion and surrounding environment, is extracted from the original 3D volume dataset (step 22). In one exemplary embodiment of the invention, the extracted sub-volume comprises a plurality of spatially-proximate 2D slices of image data that are within the neighborhood of the centroid location C. For example, FIG. 7B schematically illustrates an extracted sub-volume, which comprises twenty-five 2D slices of image data proximately disposed near the selected centroid C as depicted in FIG. 7A. In this exemplary embodiment, it is assumed that the 2D slices include image data within an x-y plane in Cartesian space.

Figure 7C:
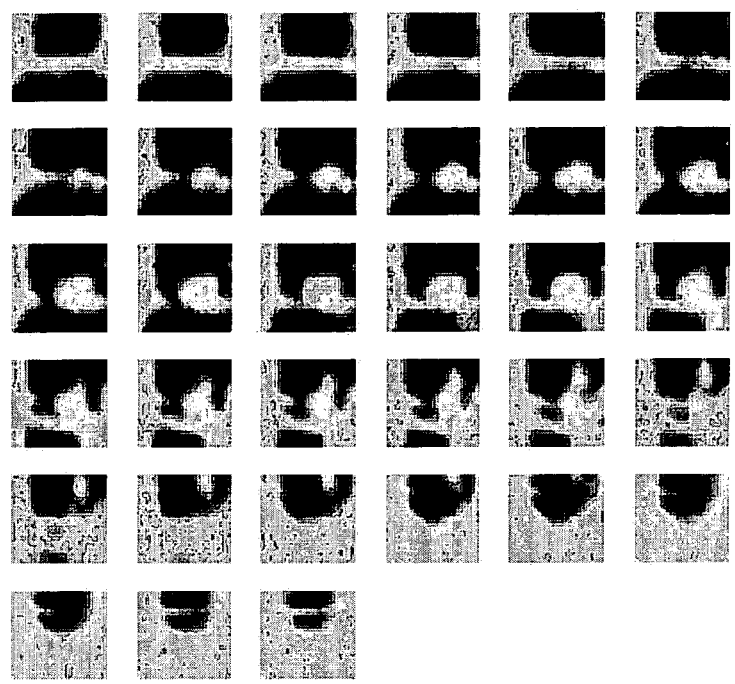

The extracted 3D sub-volume is then processed using an interpolation process to render the sub-volume isotropic (step 23). More specifically, in one exemplary embodiment wherein the 2D slices of the sub-volume include pixels in the x-y plane, an interpolation method is performed in the z-direction to make the sub-volume isotropic (i.e., to make the dimensions of the pixels in the x-y slices the same as the dimensions of the pixels in the z-direction). The interpolation process can be performed using any suitable resampling process. The exemplary diagram of FIG. 7C illustrates 2D slices of image data which result from interpolating the 2D slices of FIG. 7B.

Figure 7D:
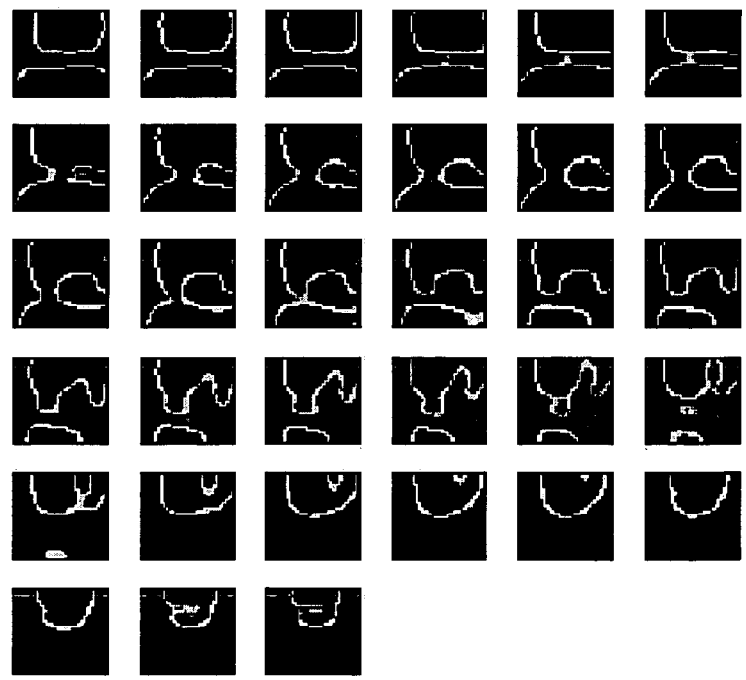
Figure 7E:
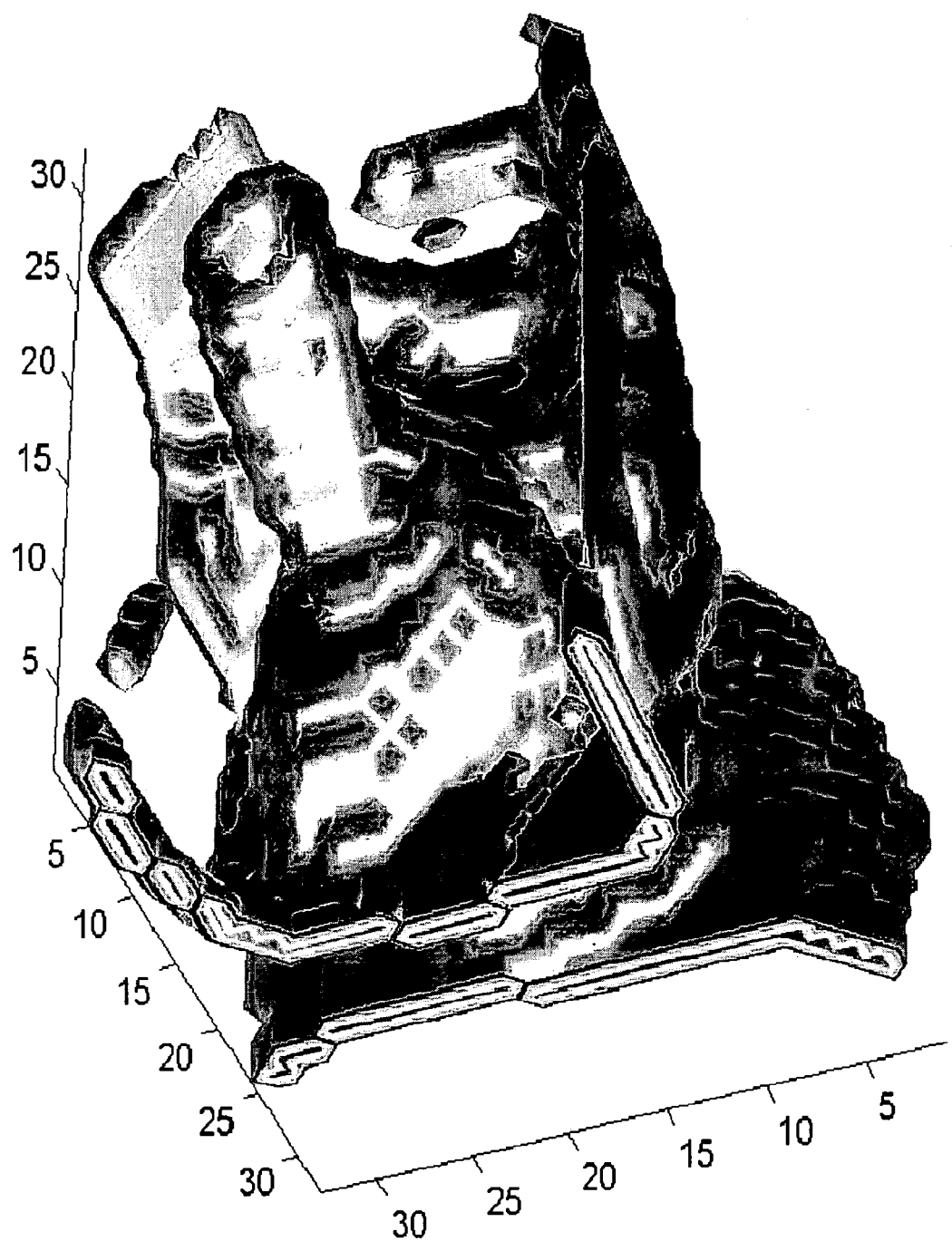

Next, a 3D edge detection method is applied to the isotropic sub-volume dataset to determine a 3D edge (surface) of the selected lesion (step 24). In one exemplary embodiment, edge detection is performed using a 3D Canny Edge Detector process, which is well known process for extracting edges that are one pixel thick, achieved through hysteresis. By way of example, FIG. 7D schematically illustrates results of an exemplary edge detection process that is applied to the interpolated 2D slices of FIG. 7C. As shown, each 2D slice includes one or more lines that represent the surface of the polyp of FIG. 7A. Further, FIG. 7E is an exemplary illustration of a 3D edge image, which is rendered using the 2D edge data of FIG. 7D. The exemplary diagram of FIG. 7E depicts a 3D edge image having a cubic volume of about 35×35×35 pixels.

The edge detection process is used to determine the coordinates of the pixels in the original 3D sub-volume space, which are included in the detected 3D edge (surface) of the lesion of interest. The results of the edge detection process are output to a spherical coordinate transformation process (step 25).

Figure 3:
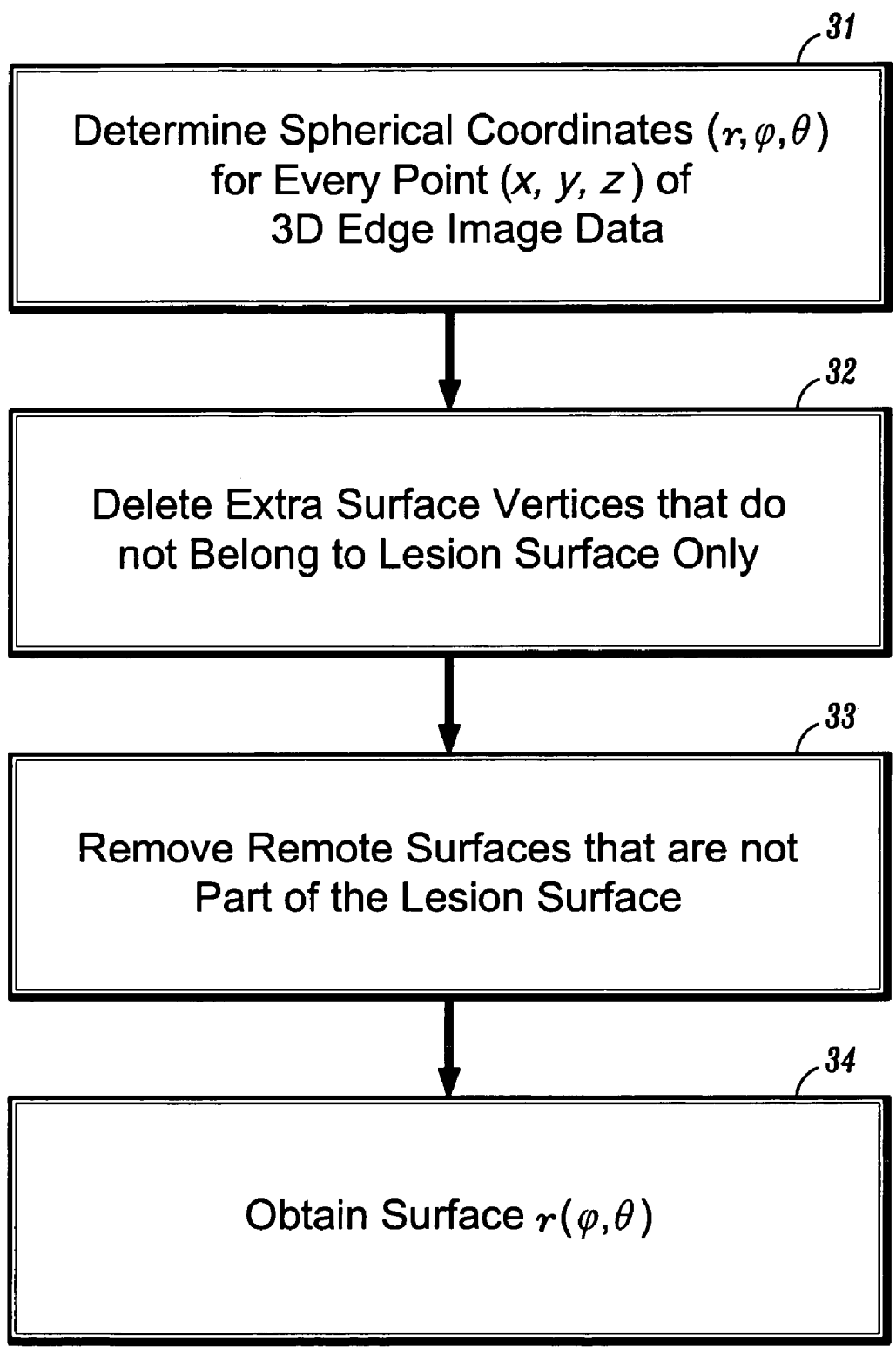
FIG. 3 is a flow diagram illustrating a method for performing a spherical coordinate transformation of a 3D edge image according to an exemplary embodiment of the invention, which can be implemented in the method of FIG. 1.
Figure 8A:
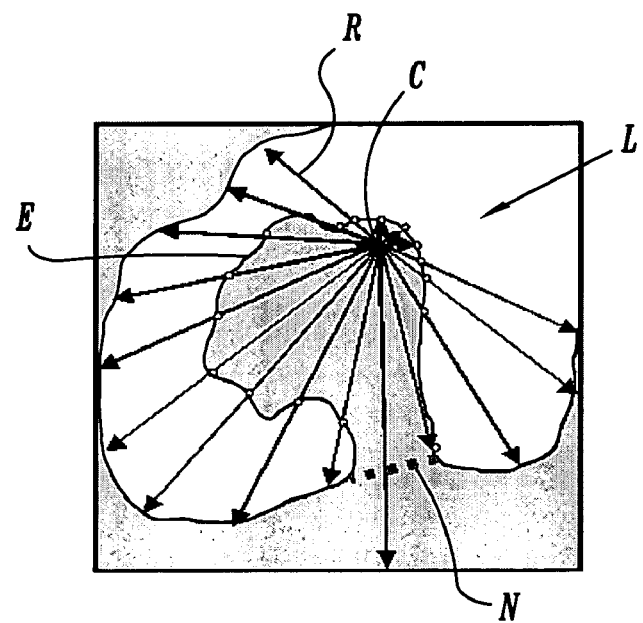
FIGS. 8A and 8B are diagrams that schematically illustrate a spherical coordinate transformation method according to an exemplary embodiment of the invention.
Figure 8B:
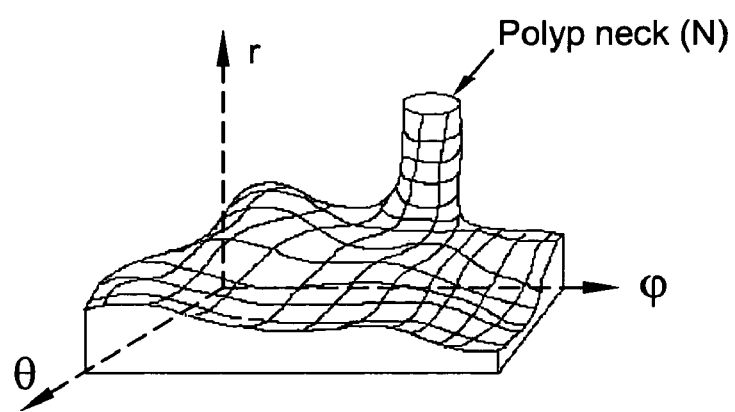

FIG. 3 is a flow diagram illustrating a method for performing a spherical coordinate transformation of 3D edge image data according to an exemplary embodiment of the invention. The method of FIG. 3 can be implemented in step 30 of FIG. 1. Further, FIGS. 8A–8B are exemplary diagrams that schematically illustrate a spherical coordinate transformation process. Referring to FIG. 3, an initial step is to transform the coordinates of the 3D edge (surface) data into spherical coordinates based on the selected/computed centroid location (step 31). In one exemplary embodiment, a centroid transformation process includes computing new coordinates (r,ϕ,θ) for every point (x,y,z) on the 3D edge (surface) of the selected lesion from the centroid C (which is considered the origin in the original 3D sub-volume space), as follows:

$$r = \sqrt{x^2 + y^2 + z^2};$$

$$tg\varphi = \frac{y}{x}; \text{ and}$$

$$\cos\theta = \frac{z}{\sqrt{x^2 + y^2 + z^2}}.$$

Next, any extra vertices which do not belong solely to the lesion surface are deleted (step 32) by, e.g., checking the intensity gradient in the radial direction from the selected (or computed) centroid C. Further, remote surfaces that are not part of the lesion surface are removed (step 33). This process results in a transformed surface representation r(ϕ,θ) (step 34), which comprises a 2D representation of the detected lesion surface in spherical coordinate space, where there is only one value r for each (ϕ,θ).

FIGS. 8A and 8B are exemplary diagrams that schematically illustrate a spherical coordinate transformation method according to the invention. More specifically, FIG. 8A illustrates a 2D slice of a sub-volume that includes a polyp which extends into a colon lumen L. The dotted line (N) denotes a "polyp neck" where the polyp is attached to the colon wall. More specifically, the "polyp neck" is the transition from the polyp head to the colon wall. When the transition is elongated, the polyp is referred to as a pedunculated polyp.

As shown in FIG. 8A, a spherical coordinate transformation is tantamount to sending a plurality of "rays" (R) from the centroid location (C) and determining where each ray (R) intersects the edge (E) of the lesion (polyp) surface in the original 3D sub-volume space, where the value of "r" represents the distance of the ray from the centroid C to where the ray intersect the edge E. FIG. 8B is a diagram that schematically illustrates a distance transform which results based on the process depicted in FIG. 8A for all the slices in the isotropic sub-volume. FIG. 8B represents a surface as would be seen from the centroid location (C) where the distance r is expressed as the height of the surface from the centroid (C).

As depicted in FIG. 8A, the rays (R) that pass through the poly neck (N) into the colon tissue do not intersect a point on the edge (E) of the polyp, but rather travel into the colon tissue (passing through the polyp neck N). As such, methods for removing remote surfaces (step 33) are employed. One exemplary embodiment for removing remote surfaces will be described in detail below with reference to, e.g., FIGS. 6 and 11A–11B. In general, methods for removing remote surfaces that are not actually part of the lesion surface are based on, for example, various criteria which can be applied to limit the length of the rays that pass through, e.g., the polyp neck N.

For example, criteria such as the distance from the centroid and angular change and the intersecting loci of the rays in the far surface between two subsequent rays may be considered. The distance can be use to discriminate far areas (surfaces) from the average distance of rays in proximity of the centroid. More specifically, by way of example, if the centroid was determined with respect to a spherical-shaped polyp, then the ray distances (r) on average would be close to the radius of the spherical-shaped lesion. This is not true when, for instance, lesion such as polyp has a neck (see FIG. 11B). In the case of two adjacent rays spanning a spherical-shaped object (e.g., polyp), the points at which such rays would intersect the lesion surface would be approximately equidistant from the centroid. But when one ray intersects the polyp surface and the adjacent ray extends into the polyp neck and intersects a remote surface, the difference between the distances subtended by the end points of these two adjacent rays intersecting a surface will greatly differ. These are also detectable and represented in the spherical surface transformation as a discontinuity (see, e.g., FIG. 11B). As noted above, one exemplary process which can be implemented in step 33 of FIG. 3 will be explained in detail below with reference to, e.g., FIGS. 6 and 11A–11B.

Figure 4:
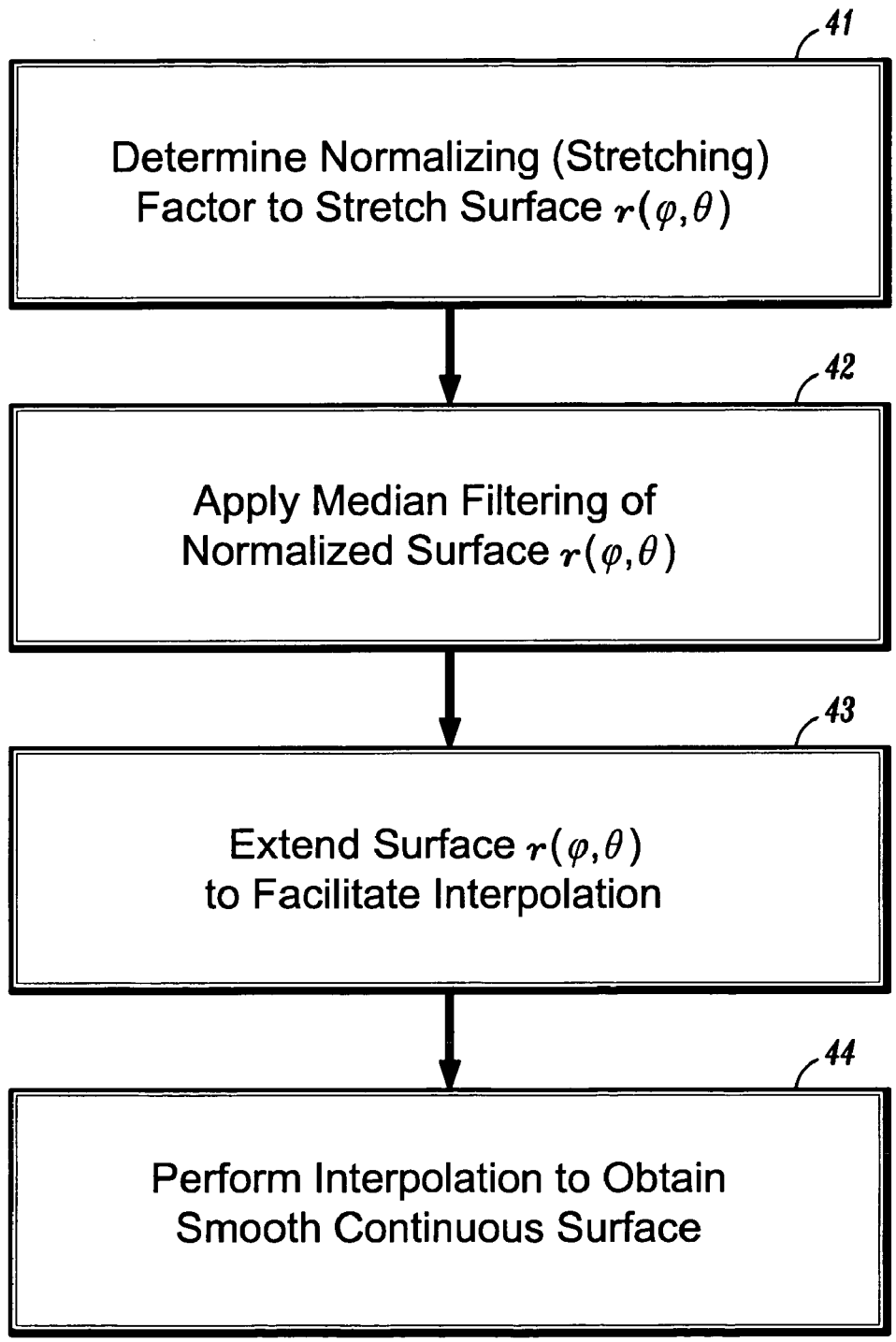
FIG. 4 is a flow diagram of a method for processing edge image data in spherical coordinate space to extract a volume of interest according to an exemplary embodiment of the invention, which may be implemented in the method of FIG. 1.

FIG. 4 is a flow diagram illustrating a method for processing the representation of the lesion surface in spherical coordinate space to accurately determine the surface of the selected lesion including the boundary (e.g., polyp neck) between the lesion (e.g., polyp), and thereby enabling the selected lesion to be separated from surrounding tissue (e.g., determining a polyp neck that separates the polyp from a colon wall). The method of FIG. 4 can be implemented for step 40 in FIG. 1. Referring now to FIG. 4, an initial step is to compute a normalizing (stretching) factor for each discreet radius value (step 41). The normalization process provides means for balancing the representation of the surface in the spherical coordinate space to thereby give equal weight to the pixels (i.e., they are scaled proportionally). The normalization process (step 41) is not required, but enables simplification of a surface interpolation process as described below (otherwise a weighted interpolation process could be implemented).

Figure 9A:
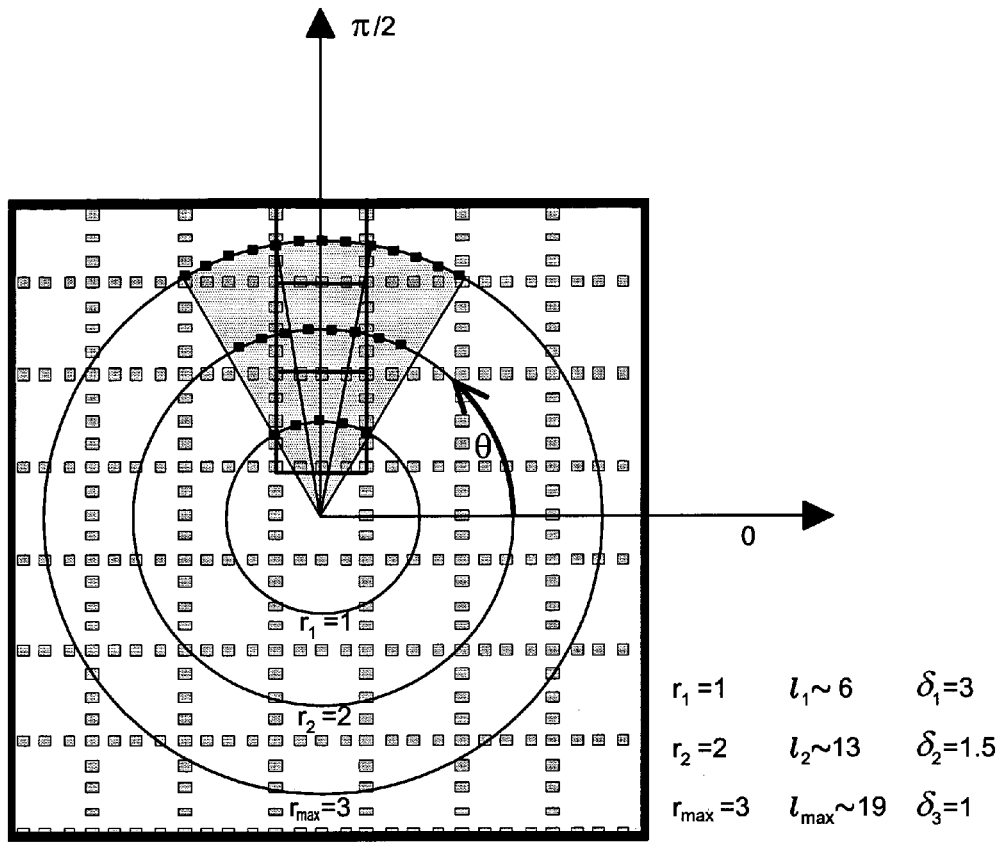
FIGS. 9A and 9B are diagrams that schematically illustrate a normalization method according to an exemplary embodiment of the invention.
Figure 9B:
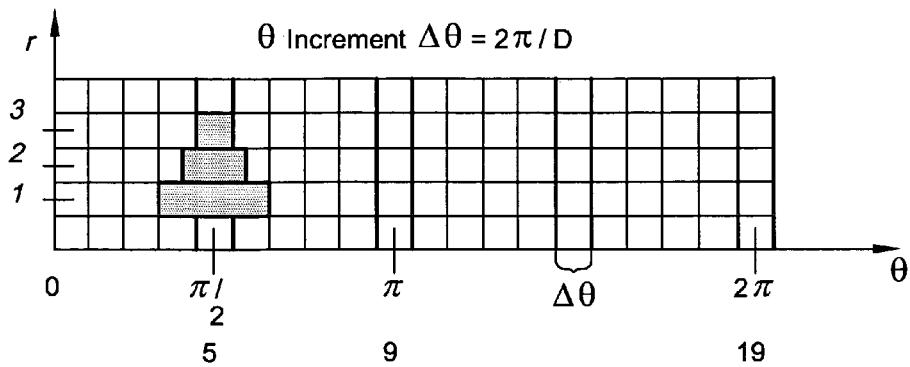

FIGS. 9A and 9B are exemplary diagrams that schematically illustrate a normalization process according to the invention. In the example, a normalization factor is determined by $\delta(r)=r_{max}/r$, a discreetization degree is determined by $D=\text{round}(2\pi r_{max})$ and an angle increment is determined by $\Delta\theta=2\pi/D$. FIG. 9A graphically illustrates a relation between points on a lesion surface which are at different radii ($r_1=1$, $r_2=2$, $r_{max}=3$). These figures illustrate a simplified version of a normalization process, relating the process to a 2D version, hence expressing the process via a transformation to polar coordinates. In this case, a given angle (as shown) will subtend a broader section of the circumference as the radius increase. When translated to polar space, see FIG. 9B, the points that are closer to the center (at $r_1$) will "stretch". A normalization factor, which is determined by $\delta(r)=r_{max}/r$, captures this stretching relation and quantizes it in terms of pixels. The values in FIG. 9A illustrate the quantized relation between pixels at distance r=1, the circumference $l_1$ rounded to the next integer value=6, and a normalization factor $\delta_1=3$. The normalization factor captures the amount of stretching required to make the innermost circumference as long as the outer circumference. Thus effectively, in the example provided, for every one unit of length along the outer circumference, $r_{max}$, there correspond 3 units of the innermost circumference. When interpolating a surface that cross different radii, it is important to properly weigh the contribution of the interpolating function, which is achieved through the exemplary normalization process. The above example extends to spherical coordinates and surfaces.

Referring again to FIG. 4, after normalization, a median filtering process is applied to the lesion surface representation $r(\phi,\theta)$ (step 42). The filtering process removes any noise that is generated as a result of the transformation process (the filtering eliminates computed noise of spurious measurements). The result of the normalization (step 41) and filtering (step 42) is a quantized rendering of the lesion surface in spherical coordinate space. Since the actual lesion surface is actually smooth and continuous, an interpolation process is performed to generate a smooth continuous surface from the quantized lesion surface, which is to be used for extracting the lesion volume from the surrounding healthy tissue. In one exemplary embodiment of the invention, to extract the lesion from the surrounding healthy tissue, the lesion surface representation $r(\phi,\theta)$ is further processed to determine a location and shape of the lesion surface which will separate the volume of interest from its environment. This process determines a boundary (separating surface) between the legion and the surrounding normal structures. For example, in the exemplary embodiment of polyp segmentation described herein, the lesion separating surface is referred to as the "polyp neck".

Referring to FIG. 4, an initial step for facilitating interpolation of a "polyp neck", for example, includes performing a method to extend the lesion surface representation $r(\phi,\theta)$ (step 43) in a manner that takes into account the fact that edges of the 2D surface representation $r(\phi,\theta)$ are connected, i.e., that $r(\phi,\theta+2\pi)=r(\phi,\theta)$ and $r(\phi+\pi,\theta)=r(\phi,\theta)$. In one exemplary embodiment, an extending process includes mapping of $r(\phi,\theta)$ to $r'(\phi', \theta')$ as follows:

(i) $r'([\pi/2 \ldots 3\pi/2],[2\pi \ldots 3\pi])=r([0 \ldots \pi],[[0 \ldots 2\pi]])$;

(ii) $r'([\pi/2 \ldots 3\pi/2],[1 \ldots \pi])=r([0 \ldots \pi],[[\pi \ldots 2\pi]])$;

(iii) $r'([0 \ldots \pi/2],[\pi \ldots 3\pi])=r([\pi/2 \ldots \pi],[[0 \ldots 2\pi]])$;

(iv) $r'([\pi/2 \ldots 3\pi],[3\pi \ldots 4\pi])=r([0 \ldots \pi],[[0 \ldots \pi]])$; and (v) $r'([3\pi/2 \ldots \pi],[\pi \ldots 3\pi])=r([0 \ldots \pi/2],[0 \ldots 2\pi])$.

Figure 10B:
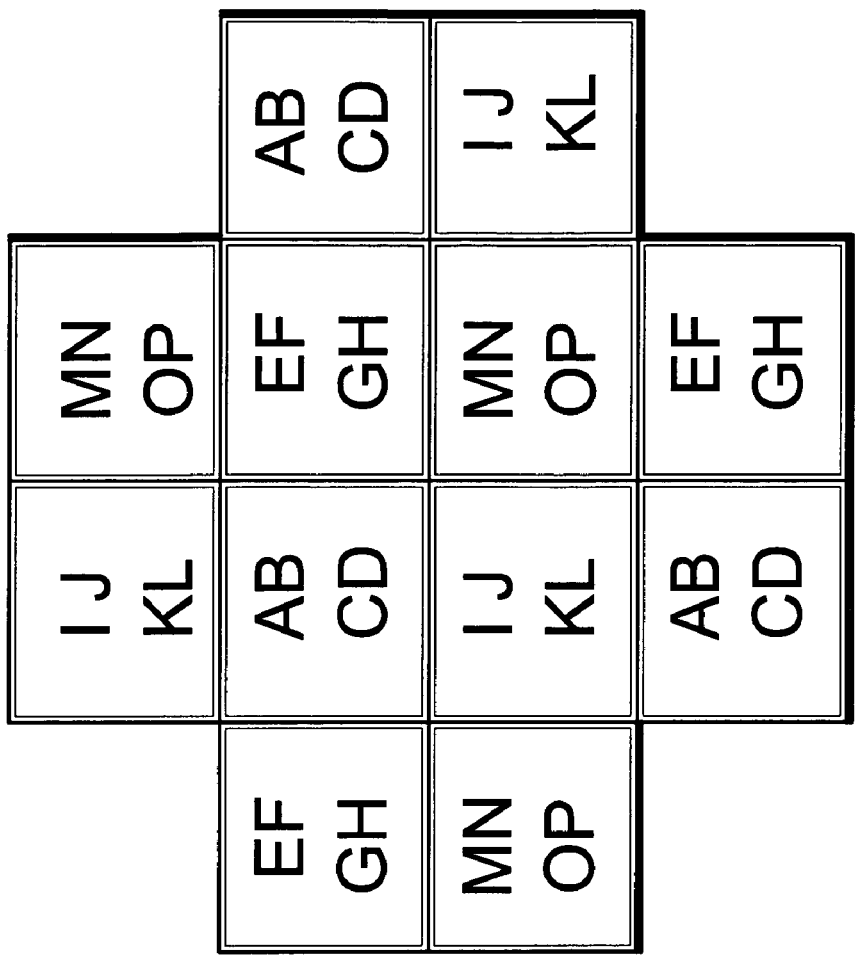
FIGS. 10A and 10B are diagrams that schematically illustrate a method for extending an image in spherical coordinate space for facilitating lesion surface interpolation, according to an exemplary embodiment of the invention.
Figure 10A:
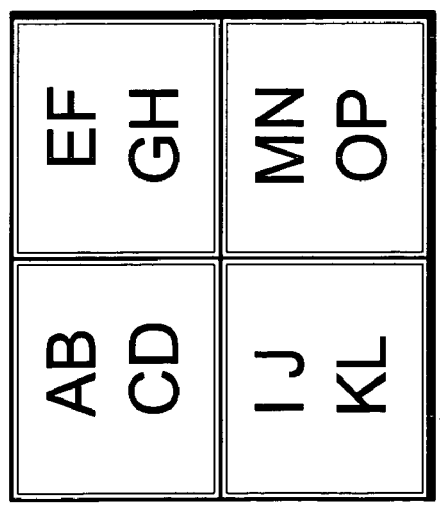

FIGS. 10A and 10B are exemplary diagrams for illustrating a method of extending the lesion surface representation $r(\phi,\theta)$, wherein FIG. 10A illustrates different areas of the lesion surface representation $r(\phi,\theta)$, and FIG. 10B illustrates results of extending the image of FIG. 10A. As depicted, the extending process essentially takes a bottom half of the image and copies it above the top of the image, takes a top half of the image and copies it below the bottom of the image, takes a left side of the image and copies it to the right side of the image and takes a right side of the image and copies it to the left side. This process essentially "folds" the image, which facilitates a smooth interpolation process. More specifically, replicating the image is performed to address any issues of support for the border areas. Border replication, folding or cross-copying is a known technique in computer vision and is employed herein to provide support for interpolation and/or filtering at the border. When computing the interpolation value for a border point on the left hand side of an image (surface), for example, only values on the right side of the surface are present. A conventional approach is that of providing support either by mirroring the values or wrapping around as performed here. This is meaningful in the context of a spherical transformation. Hence, replicating and mirroring the image is tantamount to wrapping around the center to include little extra to thereby extract a bit of overlapping, which is then translated in spherical space as a replication. Once the full interpolation has been completed, the extensions of the images are ignored and only the original image (surface) is considered.

An interpolation process is then performed using the extended image (step 45). The image extension (step 43) and interpolation (step 45) results in a determination of a smooth 3D lesion surface, which includes the boundary (e.g., polyp neck) or line of separation between the lesion and the surrounding normal anatomical structures. In other words, the process results in the extraction of a smooth, enclosed surface of the lesion in spherical coordinate space, which surface is relative to the centroid C. A next step is to determine the lesion volume in the original 3D image space.

Figure 5:
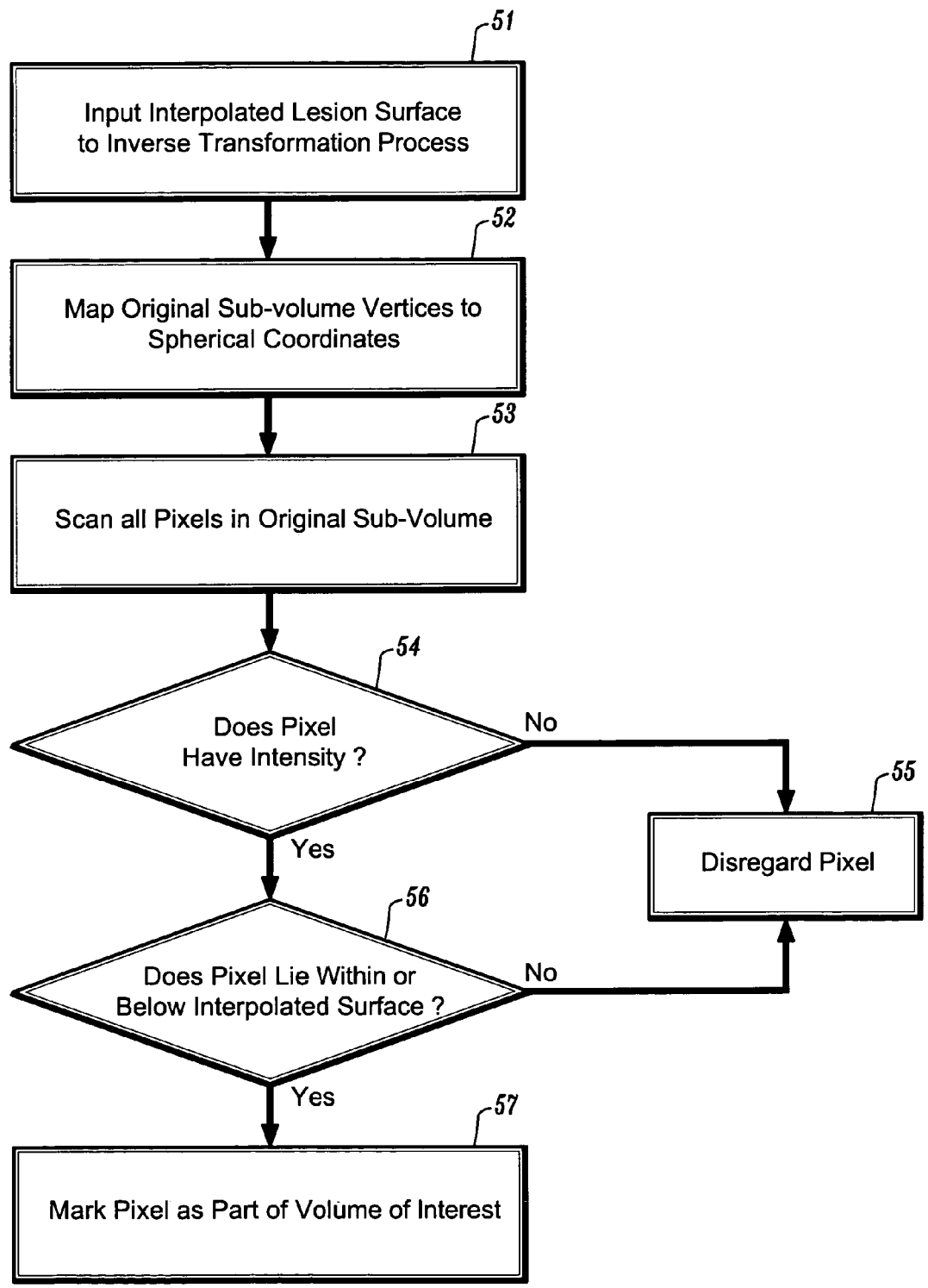
FIG. 5 is a flow diagram of a method for performing an inverse transformation from spherical coordinate space to extract a volume of interest from original 3D image data, according to an exemplary embodiment of the invention, which may be implemented in the method of FIG. 1.

FIG. 5 is a flow diagram illustrating a method for performing an inverse transformation to extract the volume of interest from the original 3D image data, according to an exemplary embodiment of the invention. The method of FIG. 5 may be applied for implementing step 50 of FIG. 1. Initially, the interpolated lesion surface data is input to an inverse transformation process (step 51). A mapping is generated (e.g., look up table) to map the interpolated lesion surface (which is in spherical coordinate space) back to the original 3D volume space (e.g., Cartesian coordinates). More specifically, in one exemplary embodiment of the invention, the original sub-volume vertices (in Cartesian coordinates) are mapped to the spherical coordinate space (step 52).

Thereafter, all pixels in the original sub-volume are scanned (step 53). For each pixel, a determination is made as to whether the pixel has intensity (step 54). If the pixel does not have an intensity value (e.g., the pixel is located in the colon lumen) (negative determination in step 54), the pixel is disregarded as not being part of the volume of interest (step 55). If the pixel has intensity (affirmative determination in step 54), but it is determined (via the mapping) that the pixel does not lie within or below the interpolated lesion surface in spherical coordinates (negative determination in step 56), the pixel will be disregarded as not being part of the volume of interest (step 55).

On the other hand, if a given pixel has intensity (affirmative determination in step 54), and is also determined (via the mapping) to lie within or below the interpolated lesion surface in spherical coordinates (affirmative determination in step 56), the pixel will be marked as part of the volume of interest (step 57). By repeating steps 54, 55, 56 and 57 for all pixels in the original 3D sub-volume, the volume of the lesion can be segmented from the original 3D sub-volume image data.

Once the volume of interest is segmented, various measurements may be performed (step 60, FIG. 1). For instance, in one exemplary embodiment, the volume of the segmented lesion is determined by counting the voxels (full and partial) that are included between the actual surface of the segmented object (polyp surface) and the interpolated surface below. These voxels are converted into mm$^3$ by considering the actual x, y and z spatial resolution of the acquired data. Furthermore, as noted above—the maximum diameter (important in polyp measurements) can be determined by computing the further distance between two extrema voxels within the extracted volume. Moments of intensity (mean, std., etc.) can be computed by considering the intensity values of the pixels comprising the volume. Curvatures and other surface characteristics can directly be derived from the voxels that characterize the surface, and are computed using known curvature formulations, wherein moments of these can also be computed.

In another embodiment of the invention, the lesion volume measurements can be made consistent and independent of the initially selected centroid location of the lesion as provided by the user input or candidate detection by performing an iterative procedure. For example, one exemplary iterative procedure includes, for example, determining a new center of volume, and repeating the extraction process (e.g., steps 30, 40 and 50 of FIG. 1), until convergence of the volume value.

Figure 11A:
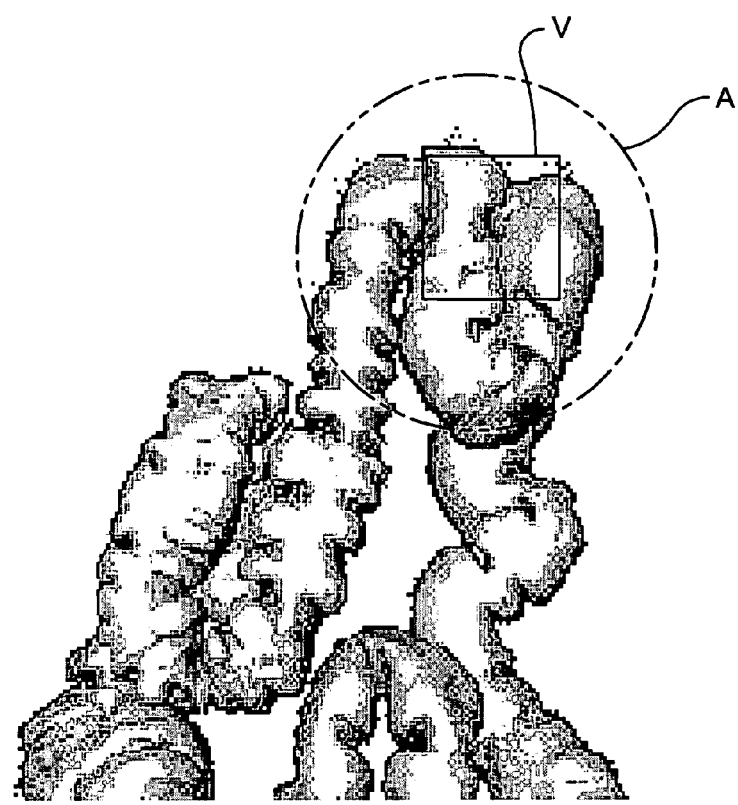
FIGS. 11A and 11B are exemplary diagrams to illustrate a polyp segmentation process that can result in over-segmentation of a polyp due to detection of false surfaces that are not part of the lesion surface.
Figure 11B:
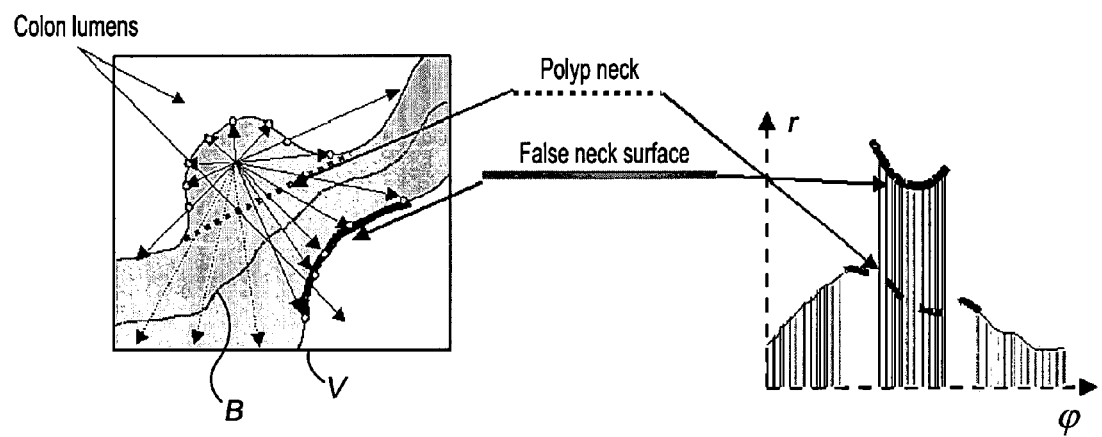

Exemplary lesion segmentation systems and methods according to the invention are well adapted for preventing over-segmentation of lesion volumes by providing methods for removing remote/false surfaces that are not actually part of the lesion surface (as discussed above with reference to step 33 of FIG. 3). For instance, with respect to 3D segmentation of polyps, FIGS. 11A and 11B are exemplary diagrams that illustrate a circumstance in which over-segmentation can occur for 3D polyp segmentation. In particular, FIG. 11A is an exemplary 3D view of a colon having an area (A) in which loops of the colon are in contact. As depicted in FIG. 11B, a volume of interest (V) may contain two colon lumens that are separated by tissue or by a boundary (B) between two adjacent colon walls, one of which contains a polyp of interest. As depicted in FIG. 11B, when a spherical coordinate transformation is applied by casting rays from a center location of the poly, a false surface ("false neck surface") below the polyp may belong to another bowel loop, which may be inaccurately interpreted as the true polyp neck. An illustrative depiction of the transformation results is shown in FIG. 11*b*, wherein the transformation data includes the "false neck surface". This false surface should be excluded from the consideration when constructing the polyp surface because if the false surface is not removed, the "extra" surface patch may form the false polyp neck and as a result the interpolated polyp surface may be much larger than the actual polyp. Accordingly, to prevent over-segmentation, a method can be implemented in accordance with the invention to disregard remote surfaces that are not actually part of the surface of the selected lesion.

Figure 6:
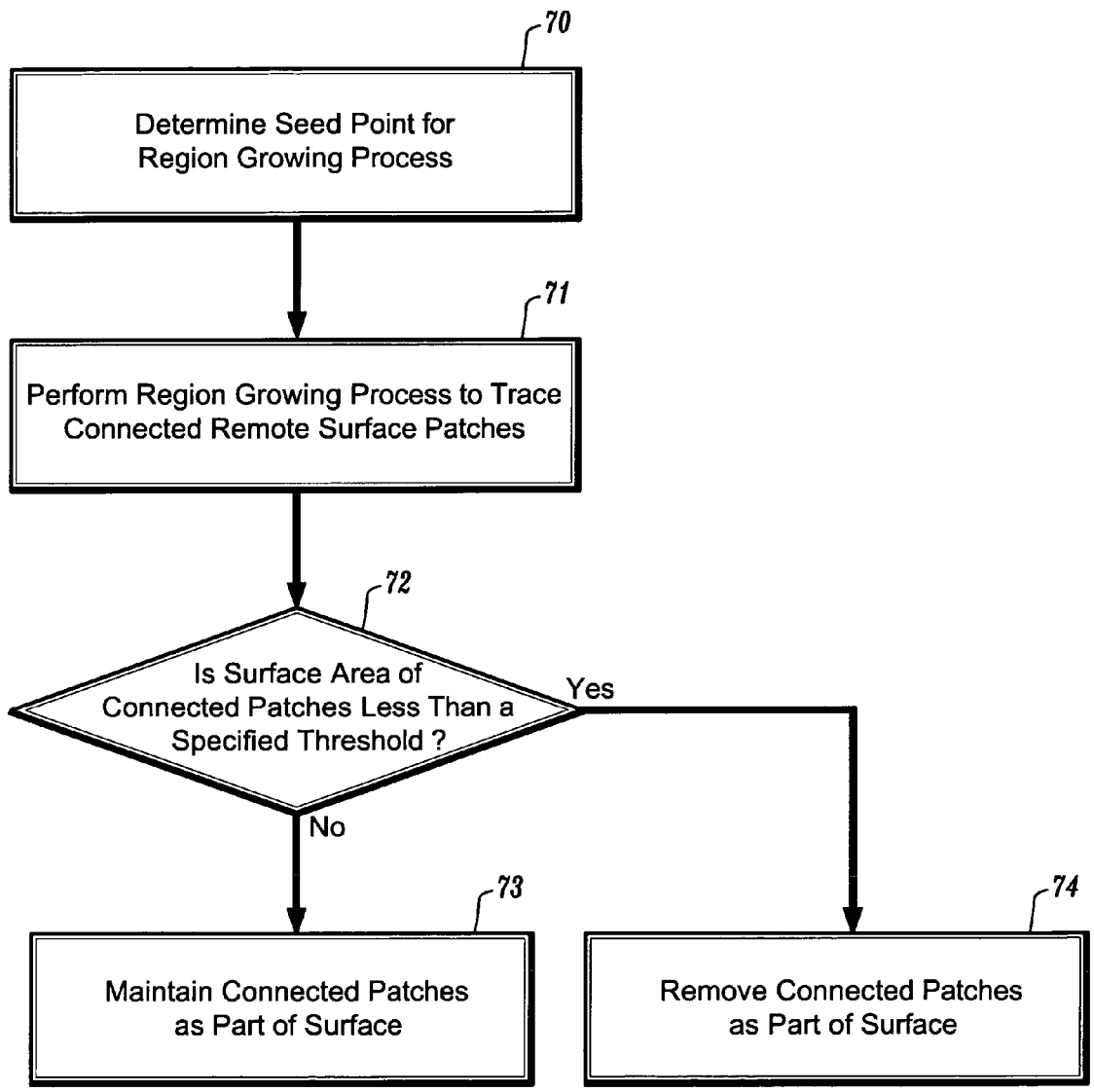
FIG. 6 is a flow diagram of a method for determining false surfaces that are not part of a lesion surface to prevent over segmentation of the lesion volume according to an exemplary embodiment of the invention, which can be implemented in the method of FIG. 1.

FIG. 6 is a flow diagram illustrating a method for removing a false surface patch according to one exemplary embodiment of the invention. In the method of FIG. 6, a region-growing process is implemented to trace connected remote surface patches. An initial step is to determine one or more "seed points" for the region growing process (step 70). In one exemplary embodiment, the seed points for region growing are the points with the radius values higher than adaptive threshold. The adaptive threshold is equal to the median radius value plus standard deviation of radius in the sub-volume of interest.

When the seed point(s) are determined, a region growing process is performed using the seed points to trace connected remote surface patches (step 71). For each connected set of surface patches, a determination is made as to whether the surface area of the connected set of patches is less than a specified threshold (step 72). For instance, in one exemplary embodiment, the threshold is set to ⅓ of the surface area of the polyp surface in spherical coordinates. In other instances and when performing segmentation with different structures, this ratio may be varied. If the surface area of a connected set of patches is determined to be less than the threshold (affirmative determination in step 72), the connected set of patches will be disregarded and not considered as part of the lesion surface (step 74). On the other hand, if the surface area of a connected set of patches is not less than the threshold (negative determination in step 72), the connected set of patches will be included as part of the lesion surface (step 73).

It is to be appreciated that as noted above, the exemplary systems and methods described herein can be implemented in various applications, such as 3D polyp segmentation. In such case, the exemplary methods according to the invention as described herein can be implemented to accurately extract polyps from the surrounding colon wall. Moreover, the exemplary systems and methods could be implemented to provide automatic polyp size measurements for the user (radiologist), such as computing additional features such as intensity variance, texture, etc., which will help to distinguish between polyps and stool. Moreover, exemplary methods according to the invention can be used to obtain accurate polyp shape characteristics, which help to discriminate polyps from other sources of false positives such as prominent folds and artifacts.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for automatic 3D (three-dimensional) lesion segmentation, comprising the steps of:
   determining a 3D surface of a lesion in an original 3D volume space;
   transforming the 3D surface of the lesion to a spherical coordinate space;
   processing the 3D surface in the spherical coordinate space to determine a lesion surface in the spherical coordinate space which separates the lesion from surrounding normal structure;
   transforming the lesion surface in the spherical coordinate space to the original 3D volume space; and
   extracting a volume corresponding to the lesion from the original 3D volume space using the transformed lesion surface.

2. The method of claim 1, wherein the step of determining a 3D surface comprises:
   extracting a 3D sub-volume from the original 3D volume space which surrounds the lesion;
   interpolating image data in the 3D sub-volume to render the 3D sub-volume isotropic; and
   determining a 3D edge of the lesion in the isotropic 3D sub-volume.

3. The method of claim 2, wherein the step of determining a 3D edge of the lesion is performed using a 3D Canny edge detection process.

4. The method of claim 1, wherein the step of transforming the 3D surface of the lesion to a spherical coordinate space comprises:
   determining a centroid location of the lesion in the original 3D volume space; and
   determining a spherical coordinate for each pixel of the 3D surface based on the centroid location; and
   generating a 2D representation of the 3D surface in the spherical coordinate space using the spherical coordinates.

5. The method of claim 4, wherein the centroid location of the lesion is determined by an automated process.

6. The method of claim 4, wherein the centroid location of the lesion is selected by a user.

7. The method of claim 4, further comprising normalizing the 2D representation of the 3D surface in the spherical coordinate space.

8. The method of claim 7, further comprising median filtering the normalized 2D representation.

9. The method of claim 4, wherein the step of processing the 3D surface in the spherical coordinate space comprises the steps of:
   extending the 2D representation of the 3D surface in the spherical coordinate space; and
   interpolating the extended 2D representation to determine a separating surface that separates the lesion from an anatomical structure to which the lesion is attached.

10. The method of claim 1, wherein the step of transforming the lesion surface in the spherical coordinate space to the original 3D volume space comprises mapping vertices in the original 3D volume space to the spherical coordinate space.

11. The method of claim 10, wherein the step of extracting the volume corresponding to the lesion from the original 3D volume space using the transformed lesion surface, comprises the step of including all pixels in the original 3D volume space that lie within or below the lesion surface in spherical coordinates as part of the lesion volume.

12. The method of claim 1, wherein the lesion is a colonic polyp.

13. The method of claim 12, wherein the step of processing the 3D surface in the spherical coordinate space to determine a lesion surface in the spherical coordinate space which separates the lesion from surrounding normal structure lesion surface, comprises the step of determining a polyp neck.

14. The method of claim 1, further comprising the step of measuring one or more parameters associated with the extracted volume.

15. The method of claim 1, further comprising repeating the method steps in an iterative manner to obtain convergence of a volume value.

16. The method of claim 1, further comprising the step of:
   determining if the lesion surface representation in the spherical coordinate space comprises a false surface that is not actually part of the lesion; and
   removing a false surface that is determined to be included in the lesion surface representation.

17. A program storage device readable by a computer, tangibly embodying a program of instructions executable by the computer to perform method steps for automatic 3D (three-dimensional) lesion segmentation, the method steps comprising:
   determining a 3D surface of a lesion in an original 3D volume space;
   transforming the 3D surface of the lesion to a spherical coordinate space;
   processing the 3D surface in the spherical coordinate space to determine a lesion surface in the spherical coordinate space which separates the lesion from surrounding normal structure;
   transforming the lesion surface in the spherical coordinate space to the original 3D volume space; and
   extracting a volume corresponding to the lesion from the original 3D volume space using the transformed lesion surface.

18. The program storage device of claim 17, wherein the instructions for performing the step of transforming the 3D surface of the lesion to a spherical coordinate space comprises:
   determining a centroid location of the lesion in the original 3D volume space; and
   determining a spherical coordinate for each pixel of the 3D surface based on the centroid location; and
   generating a 2D representation of the 3D surface in the spherical coordinate space using the spherical coordinates.

19. The program storage device of claim 17, wherein the lesion is a colonic polyp.

20. A method for automatic 3D (three-dimensional) lesion segmentation, comprising the steps of:
   determining a 3D surface of a lesion within an image dataset in a first coordinate space;
   performing a centroid transformation of the 3D surface using a centroid of the lesion in the first coordinate space, to generate a transformed surface representation of the 3D surface in a second coordinate space;
   processing the transformed surface representation to determine a lesion surface which separates the lesion from surrounding normal structure; and
   transforming the lesion surface in the second coordinate space back to the first coordinate space to segment the lesion from the image dataset.

21. The method of claim 20, wherein the step of determining a 3D surface comprises:
   extracting a 3D sub-volume of image data from the image dataset which surrounds the lesion;
   interpolating image data in the 3D sub-volume to render the 3D sub-volume isotropic; and
   determining a 3D edge of the lesion in the isotropic 3D sub-volume.

22. The method of claim 21, wherein the step of determining a 3D edge of the lesion is performed using a 3D Canny edge detection process.

23. The method of claim 20, wherein the step of performing a centroid transformation comprises performing a spherical transformation.

24. The method of claim 23, wherein performing a spherical transformation comprises:
   determining a spherical coordinate for each pixel of the 3D surface based on the centroid location; and generating a 2D representation of the 3D surface in the spherical coordinate space using the spherical coordinates.

25. The method of claim 20, further comprising the step of automatically determining the centroid location of the lesion in the first coordinate space.

26. The method of claim 20, further comprising the step of a user selecting coordinates of the centroid.

27. The method of claim 20, further comprising normalizing the transformed surface representation.

28. The method of claim 27, further comprising median filtering the normalized transformed surface representation.

29. The method of claim 20, wherein the step of processing the transformed surface representation comprises interpolating the transformed surface representation to determine a separating surface that separates the lesion from an anatomical structure to which the lesion is attached.

30. The method of claim 20, wherein the step of transforming the lesion surface in the second coordinate space back to the first coordinate space to segment the lesion from the image dataset comprises mapping vertices in the image dataset in the first coordinate space to the second coordinate space.

31. The method of claim 30, further comprising segmenting the lesion by including all pixels in the image dataset that lie within or below the lesion surface in the second coordinate space as part of a volume of the lesion.

32. The method of claim 31, further comprising the step of measuring one or more parameters associated with the segmented lesion.

33. The method of claim 31, further comprising repeating the method steps in an iterative manner to obtain convergence of a volume value.

34. The method of claim 20, wherein the lesion is a colonic polyp.

35. The method of claim 34, wherein the step of processing the transformed surface representation to determine a lesion surface which separates the lesion from surrounding normal structure comprises determining a polyp neck.

36. A program storage device readable by a computer, tangibly embodying a program of instructions executable by the computer to perform method steps for automatic 3D (three-dimensional) lesion segmentation, the method steps comprising:
    determining a 3D surface of a lesion within an image dataset in a first coordinate space;
    performing a centroid transformation of the 3D surface using a centroid of the lesion in the first coordinate space, to generate a transformed surface representation of the 3D surface in a second coordinate space;
    processing the transformed surface representation to determine a lesion surface which separates the lesion from surrounding normal structure; and
    transforming the lesion surface in the second coordinate space back to the first coordinate space to segment the lesion from the image dataset.

37. The program storage device of claim 36, wherein the instructions for performing a centroid transformation comprises instructions for performing a spherical transformation.

38. The program storage device of claim 37, wherein the instructions for performing a spherical transformation comprise instructions for performing the steps of:
    determining a spherical coordinate for each pixel of the 3D surface based on the centroid location; and
    generating a 2D representation of the 3D surface in the spherical coordinate space using the spherical coordinates.

39. The program storage device of claim 36, wherein the instructions for performing the step of processing the transformed surface representation comprise instructions for interpolating the transformed surface representation to determine a separating surface that separates the lesion from an anatomical structure to which the lesion is attached.

40. The program storage device of claim 39, wherein the lesion is a colonic polyp and wherein the instructions for processing the transformed surface representation to determine a lesion surface which separates the lesion from surrounding normal structure comprise instructions for determining a polyp neck.

* * * * *